July 9, 1946.　　　　E. A. FORSBERG　　　2,403,513
DEVICE FOR DETERMINING THE DEFLECTION OF ROTATING BODIES
Filed Sept. 21, 1943　　　　2 Sheets-Sheet 1

WITNESS:

INVENTOR
Erik August Forsberg
BY
Busser and Harding
ATTORNEYS.

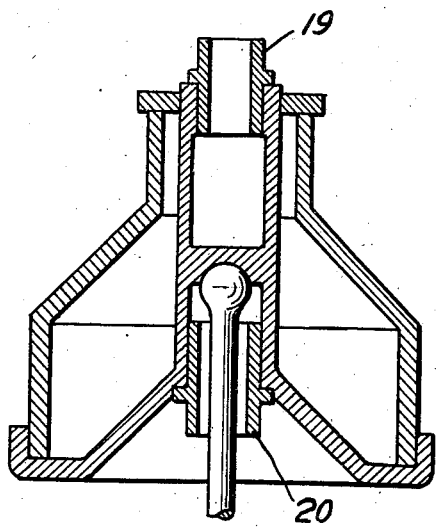
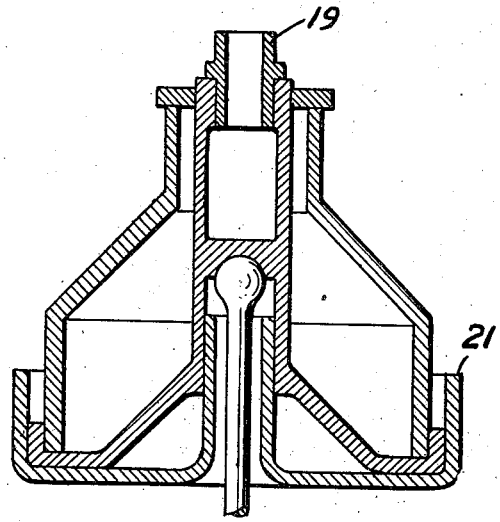
FIG. 3.   FIG. 4.
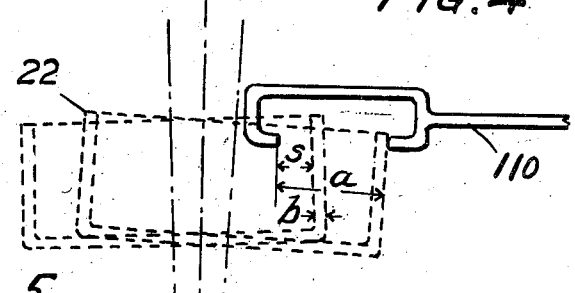
FIG. 5.
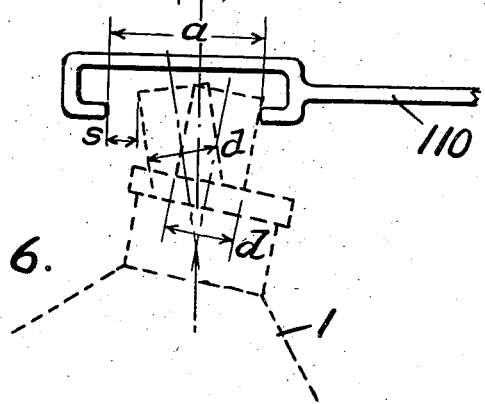
FIG. 6.

Patented July 9, 1946

2,403,513

UNITED STATES PATENT OFFICE 2,403,513

DEVICE FOR DETERMINING THE DEFLECTION OF ROTATING BODIES

Erik August Forsberg, Nockeby, Sweden, assignor to Aktiebolaget Separator, Stockholm, Sweden, a corporation of Sweden Application September 21, 1943, Serial No. 503,209
In Sweden October 8, 1942

2 Claims. (Cl. 73—66)

For various purposes, for instance in the balancing of rapidly rotating bodies, it is important to be able to determine, with regard to their magnitude and preferably also to their position, the deviations which, during rotation, are carried out by the body from its position of equilibrium, or what is called the deflection of the body. The present invention has for its object to enable a quick and exact measuring of such deflections.

Fig. 1 is a diagrammatic side view of a body mounted on a spindle associated with deflection-determining means.

Fig. 2 is a detail sectional view through shaft 2, showing a top view of elements 16 and 17 of Fig. 1, with contact 15 on element 17.

Fig. 3 is a vertical section of an element to be balanced, mounted for deflection in any direction and showing auxiliary elements useful in determining the deflection.

Fig. 4 is a vertical section similar to Fig. 3 of an alternative arrangement.

Figs. 5 and 6 show alternative methods for determining the amplitude of deflection.

Figure 1:
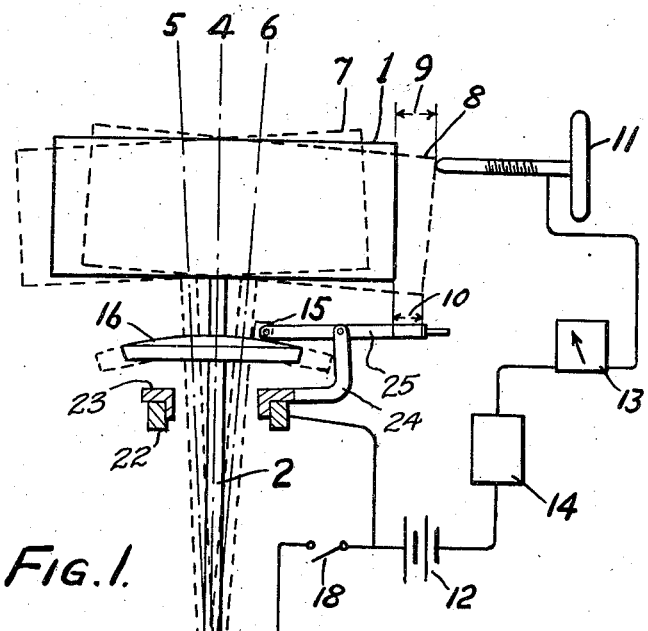

The body 1 may be assumed to be secured to a shaft 2, which can swing about the point 3. If the body 1 is a centrifugal bowl, the shaft, between the body and the point 3, may be supported by a radially elastic bearing, which is not shown, since it is well known in the art. If there are no disturbing forces and if the body 1 is mass-symmetric about the shaft 2, the latter will lie still in space and take up the position 3—4. The body will then occupy the position shown in full lines and no deflections will take place. On the contrary, if the body is not mass-symmetric about the shaft 2, the latter will describe a conic surface having its pointed end at the point 3 and will thus take up the positions 5 and 6 at intervals of half a turn, the body 1 thereby occupying the positions 7 and 8. At the top-side of the body 1 there will then be the deflection 9 and at its bottom side a deflection 10. The deflection may also be referred to the shaft or any other part connected to the body or the shaft. It should be observed that the manner in which the body is maintained in rotation and the way in which the shaft is supported is of no importance, since while these factors may have an influence on the interpretation of the deflections, they do not affect the determination of the same, which latter is the sole object of this invention.

Thus the purpose is to determine the deflection 9 and/or the deflection 10, or the deflection at any other point of the body 1 or of any part rotatable therewith.

The magnitude of the deflection is calculated in linear measure from the middle position; the position of the deflection in angular measure from any fixed point of the body 1.

For determining the magnitude of the deflection a radially displaceable organ provided with a measuring device, for instance a micrometer screw 11, is used. The body 1 and the measuring element 11 are spaced from each other and each connected to one of the poles of an electricity source 12, suitably for direct current. At the measuring the element 11 is moved radially inwards towards the body 1 until these parts come into contact with each other at that moment when the deviation of the body 1 is directed towards the element 11. In the electric circuit a series of short impulses will then occur, which should be observed in any suitable way. For this purpose a telephone receiver may be used, producing a tone of a frequency equal to the number of revolutions of the body, or advantageously a galvanometer 13. In any case it may be of advantage to amplify the current impulses in a manner known per se by means of an amplifier 14.

The position of the measuring element 11 at a deflection equal to 0, i. e. with a body standing still in the middle position or with an exactly balanced body, is determined and advantageously set to 0. The position of the element 11 relative to this zero-position at the moment when current impulses at first occur, obviously indicates the magnitude of the deflection. The point of the element 11 should be made of a hard material not readily oxidable in order to prevent rapid change of the zero-position by wear. It may also be suitable to make the point elastic to a certain degree.

Figure 2:
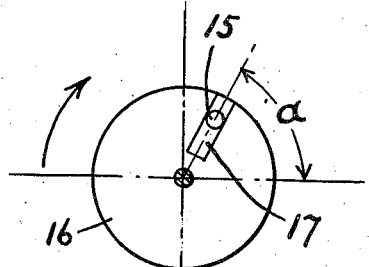

For determining the position of the deflection a special device is used for connecting the electric line to the rotating system. The current is led in series through a stationary ring 22, a ring 23 supported thereby and revoluble therein, an arm 24 and a lever 25, to a piece 15, which, by movement of lever 25, may be made to contact or clear an element 16 taking part in the rotation. In order to avoid vibrations at the contacting surface, this is advantageously formed as a sector of a sphere having the point 3 as its centre. The element 16 is electrically conductive and electrically connected to the rest of the rotating system, but is provided with an insulated section 17 as indicated in Fig. 2. The said element should be connected for rotation in synchronism with the body 1 and always in such a way that the section 17 has a known position relative to the fixed point of the body to which the position of the deflection is referred; the section 17 and the fixed point should advantageously be arranged in the same radial plane. The contacting piece 15 is supported in such a way that it can be turned around the shaft 2 and that its position can be read off. One of the rings 22 and 23 may be provided with a pointer and the other with a graduated scale. If, at the moment when the body 1 is contacting with the element 11, the piece 15 contacts with the element 16 at a point other than the insulated section 17, the circuit is closed and a current that deflects the galvanometer flows. If the contacting piece 15 is now turned around the shaft 2 until it touches the section 17 at the contacting moment, no current can pass and the deflection of the pointer ceases. Thus, the position of the contacting piece 15 when the deflection of the pointer ceases shows the position of the deflection. If the device is so adjusted that the section 17 and the fixed point lie at the same axial plane, and the deflection of the galvanometer pointer ceases when the contacting piece 15 occupies the position shown in Fig. 2, it is obvious that the deflection of the body 1 amounts to the angle $\alpha$ from the fixed point, reckoned in the direction of the movement.

It may, however, happen incidentally that the contacting piece 15 is in the right position already at the beginning. No deflection of the galvanometer pointer 13 will then take place, and there is thus a risk that the measuring element 11 is screwed too far inwards and may get damaged by too heavy blows against the body 1. To avoid this the contact between the elements 15 and 16 may be coupled in parallel with a switch 18, which in the figure is shown connected to the point 3, but it will be understood that it may be coupled to any other point of the rotating system, for instance to the lower side of the element 16. At the beginning of the measuring the switch 18 is kept closed, and consequently the current can pass thru as soon as the body 1 and measuring element 11 contact, even if at that moment the contacting piece 15 happens to be at the section 17. As soon as the pointer of the galvanometer 13 deflects, the switch is opened and—if required—the contacting piece is turned until the deflection of the pointer ceases. The measuring is now completed.

It is also possible to make the element 16 insulated and to have the section 17 in electric connection with the rotating system. In such a case the deflection of the galvanometer pointer will usually cease when the switch 18 is opened, and will appear again when the contacting piece 15 stands in the right position.

If it is desirable to carry out the measuring at different axial heights, either two or more measuring elements 11 may be used, or the element 11 may be axially adjustable.

It has been assumed above that the measuring is carried out against the body 1 itself. The body 1 is, however, often by reason of its shape or the nature of its surface unsuitable for this purpose, and there may also be other reasons for effecting the measuring otherwise. The simplest way is then to measure against the shaft 2 which, however, can be done only if the shaft 2 and the body 1 are maintained in unchangeable position relative to each other. It is in many cases preferable to provide the body 1 with special measuring elements which are placed on the body 1 in such a manner that their symmetry-axis coincides with the axis whose deflection is to be measured.

If, as is often the case with separator bowls, the body 1 is provided with a central hole, measuring elements 19, 20 as shown in Fig. 3, could be inserted in the hole at one or both ends. Or the body may be placed in a casing 21, Fig. 4, concentric with the body 1, and against which the measuring is carried out.

Such measuring elements (and perhaps in particular cases the body 1 itself) may be so arranged that automatic adjustment to zero is obtained. Fig. 5 shows the principle hereof. I assume that a measuring element 22 has been placed on the body in one way or other. The element is in the form of a ring, concentric with the axis of the body. (If any part of the body itself is shaped in this way and in other respects suitable for measuring according to this method, the measuring element 22 could of course be dispensed with.) The measuring element 110 is here double-sided, so that the measuring can be carried out by moving it either inwards or outwards. When the measuring is made, the element 110 is first moved in the one direction, for instance inwards, until it contacts with auxiliary element 22. The position of the element 110 is observed; for the sake of convenience the scale may here be adjusted to zero. Then the measuring element 110 is pushed in the opposite direction until it contacts again. If the displacement required, which is indicated by the measuring element 110, is $s$, the distance between the two contacting surfaces of the measuring element 110 is $a$, and the thickness of the ring 22 is $b$, the magnitude of the deflection is obviously $= \frac{1}{2}(a-b-s)$.

The deviation is thus determined without having to carry out adjustment relative to the body 1 in its position of rest.

The same principle may be used with the shaft itself, or with an auxiliary measuring element placed centrally as shown in Fig. 3—or even with the body itself—by measuring on both sides, as indicated in Fig. 6. If the diameter of the auxiliary element (the shaft or the body) is $d$, then the deflection is $= \frac{1}{2}(a-d-s)$.

What I claim and desire to protect by Letters Patent is:

1. Means for measuring the deflection of a rotating body supported on the outer end of a shaft, a radially adjustable element adapted to be adjusted radially with relation to the rotating body to make electrical contact with the rotating body after deflection, an element rotatable with the body having an electrical contact portion and an insulated portion, an electrical contact member adapted to engage the element rotating with the body, said electrical contact member being adapted to be shifted about the axis of the shaft over the face of said rotating element, and an electric circuit having in series a source of current, the body, the element rotatable therewith, the electric contact member, the radially adjustable element and an indicating instrument.

2. Means for measuring the deflection of a rotating body supported on the outer end of a vertical shaft which can be swung about the lower end thereof, a radially adjustable element adapted to be adjusted radially with relation to the rotating body to make electrical contact with the rotating body after deflection, an element rotatable with the body formed as a sector of a sphere having an electrical contact portion and an insulated portion whose center is located at the other end of the shaft, an electrical contact member adapted to engage the element rotating with the body, said electrical contact member being adapted to be shifted about the axis of the shaft over the face of said rotating element, and an electric circuit having in series a source of current, the body, the element rotatable therewith, the electric contact member, the radially adjustable element and an indicating instrument.

ERIK AUGUST FORSBERG.